United States Patent Office 2,783,128
Patented Feb. 26, 1957

2,783,128

PROCESS OF PRODUCING CRYOLITE FROM WASHING AND WASTE LIQUORS CONTAINING SODIUM FLUORIDE

Günther Wendt, Töging (Inn), Germany, assignor to Vereinigte Aluminium-Werke Aktiengesellschaft, Bonn (Rhine), Germany, a corporation of Germany No Drawing. Application September 15, 1954,
Serial No. 456,333

Claims priority, application Germany October 29, 1953

1 Claim. (Cl. 23—88)

This invention relates to a process of producing cryolite from washing and waste liquors containing sodium fluoride.

In many branches of the industrial chemistry of fluorine, waste gases are produced which in some cases contain substantial amounts of fluorine. This is the case, for example, in plants dealing with the calcination of cryolite or the production of aluminum fluoride or other fluorine products, in which in consequence of hydrolytic or thermal dissociation, fluorine is passed into the waste gases, in some cases in considerable amounts. In order to prevent damage, to avoid losses of fluorine and to obtain better economy, it is necessary in such plants, to remove the fluorine contained in the waste gas in the form of hydrogen fluoride, silicon tetrafluoride, or the like and to recover it. This can be achieved most simply by scrubbing the waste gases with soda or other alkaline solutions. This results in the formation of washing lyes which may contain up to 50 grammes or more of NaF per litre. It is known to precipitate cryolite from such lyes with the aid of solid aluminum fluoride or aluminum fluoride hydrate, the reaction proceeding according to the following equation:

$$3NaF + AlF_3 = Na_3AlF_6$$

For this purpose use is made of solid aluminum fluoride or alternatively solid hydrated aluminum fluoride. Both products are almost insoluble in water under normal conditions and are therefore generally used in the form of an aqueous suspension. However, even when using very freshly produced hydrated aluminum fluoride, the NaF content precipitated is usually not more than 50 to 60% of the first runnings and this is true even when a considerable excess of hydrated aluminum fluoride is used. The yields are however usually even considerably lower. As a consequence in this very uneconomical process, a cryolite contaminated with a substantial proportion of aluminum fluoride and thus giving an acid reaction is obtained, which is unsuitable for many purposes.

In every case, as a result of the alkaline washing, F is bound and forms NaF, which can be concentrated to about 50 grammes of NaF per litre. A washing lye having this NaF content is consumed and must be replaced by fresh soda solution. On account of the highly poisonous nature of NaF, the consumed lye cannot be run off immediately into the sewer system. On the contrary, it is necessary to render the NaF harmless, which in some cases is effected in the United States of America and other countries in a primitive manner by adding lime. The resulting $CaF_2$ sludge then passes as waste to the waste dump. However, it is substantially more economical to recover the fluorine in some utilisable form. In the case of a completely pure lye, that is to say a lye which is free from other salts which readily crystallise out, NaF can be crystallised out by concentrating the lye: In general, however, the lye is contaminated with sulphates, chlorides, or other salts, so that the fluorine is advantageously precipitated in a marketable form. The precipitation of the fluorine in the form of cryolite is particularly suitable for this purpose, and this can be effected theoretically by adding $AlF_3$ (in a proportion of NaF to $AlF_3$ such as 3:1). Calcined $AlF_3$ cannot be immediately used, because it is sparingly soluble in water and consequently does really not at all react with the NaF to form cryolite. It has therefore hitherto been necessary to use mainly $AlF_3$ hydrate, which reacted at least partially to form cryolite. In this case again however, only about 50 to 60% (in the case of freshly produced $AlF_3$ hydrate free from HF, a maximum of 80%) of the NaF is made available.

Apart from the fact that $AlF_3$ hydrate is relatively expensive, this process yields a cryolite of poorer quality, which is contaminated in particular with the unreacted $AlF_3$ and is generally utilisable only to a limited extent, inter alia for aluminum electrolysis.

Other methods, such as for example precipitation with the aid of aluminate lye and the injection of carbon dioxide, have in all cases the disadvantage that despite the relatively high cost of apparatus, they generally likewise yield a poor quality of cryolite.

The present invention aims at obviating the foregoing disadvantages and at producing a cryolite which can be used directly.

To this end, in a process for the production of cryolite from washing and waste liquors containing sodium fluoride by precipitation of the sodium fluoride with aluminum fluoride, the invention consists in using for the precipitation of the sodium fluoride a solution, which is, if possible, still hot, of aluminum fluoride which is freshly prepared by dissolving alumina hydrate in hydrofluoric acid. In this way yields of NaF of over 99% can be obtained and at the same time a relatively high-grade and pure cryolite is produced.

The difficulty in carrying out the process consisted first in the production of a true solution of $AlF_3$ since $AlF_3$ tends extremely easily to crystallise out in the form of a granular $AlF_3$ hydrate. This $AlF_3$ hydrate which is once crystallised out and which is generally acid, cannot be redissolved to any substantial extent and consequently reacts only very incompletely with sodium fluoride. In order to obtain a true solution, it is therefore necessary to comply very accurately with the working conditions. While laboratory tests first showed that hydrofluoric acid and, to a still greater extent, hydrated alumina are preferably used with an excess, operational experiments have shown that when suitable precipitation conditions are maintained, it is equally well possible to work with nearly stoichiometrical proportions. When the hydrofluoric acid is introduced, the batch must be thoroughly mixed. After the reaction has started, however, lengthy stirring should be avoided, since then $AlF_3$ hydrate crystallises out very rapidly, so that after only a few hours a viscous crystal paste is produced.

The hereindescribed process is accordingly carried out by producing a true solution of aluminum fluoride by introducing highly concentrated hydrofluoric acid and containing preferably 80% of HF into an aqueous suspension of alumina hydrate, whereby, if desired with the employment of a small excess of hydrofluoric acid and alumina hydrate, a hot aluminum fluoride solution is obtained in consequence of the liberation of heat of neutralisation and formation, in accordance with an almost quantitative reaction, and this solution has been found to be excellently suited for the precipitation of the sodium fluoride contained in the washing lye.

Example

In order to precipitate 2,000 kg. of NaF, 1600 kg. of hydrated alumina are first formed into a suspension in 5,000 to 6,000 litres of water, and 1200 kg. of HF of 80% strength are introduced into this solution. The heat of dissolution and neutralisation thereby produced produces a rise in temperature to 90–95° C., which has a favourable effect on the rapid dissolution of the hydrated alumina. When carrying out the precipitation, it is advantageous for the lye containing NaF and the $AlF_3$ solution to be introduced simultaneously into a tank containing an agitating mechanism or the like, and to mix the same thoroughly. As compared with the average yield of 52% obtained when using $AlF_3$ hydrate, when the process is carried out in this manner an average of 99.0% of the washed out fluorine can be precipitated. After the precipitation, the lye can be run off as waste liquor. This has the advantage over the process hitherto employed that the other salts contained in the washing and waste liquors, such as for example sulphates, sulphites and chlorides, can be removed at the same time, whereas hitherto they were recycled and resulted in cryolite having a high content of impurities. The cryolite content in the cryolite recovered can be increased by 60–70% to 90–98%, as compared with the content hitherto obtained. In addition, the washing effect of a washing plant is also improved, since the washing lye free from fluorine which is now always freshly supplied, combines the fluorine in the outgoing gas more satisfactorily and more rapidly than the NaF-containing lye hitherto used. The recovery of fluorine can thus be increased.

A substantial advantage of the hereindescribed process can however also be seen with respect to the apparatus used, since the precipitation takes only 2 to 3 hours, whereas hitherto 3 to 4 days were required for each precipitation (1 to 2 days for the formation of the suspension of the $AlF_3$ hydrate and 2 to 3 days for the precipitation itself). Consequently a very substantial saving of tank space is obtained.

Having thus described the invention, what I claim as new and desire to be secured by Letters Patent, is as follows:

In a process for the production of cryolite from sodium fluoride containing washing and waste lyes by means of an $AlF_3$ solution, the steps of adding to an aqueous suspension of alumina hydrate a concentrated HF solution of 80% strength to form a hot solution of aluminum fluoride, introducing said freshly prepared solution into a tank simultaneously with an amount of washing and waste liquor lye solution containing NaF and $AlF_3$ components so that there is present in the tank the stoichiometric proportion of NaF and $AlF_3$ which are necessary for the cryolite formation, thoroughly mixing the said components and thereafter separating the thus formed cryolite from the residual lye.

References Cited in the file of this patent

UNITED STATES PATENTS

| | | |
|---|---|---|
| 1,391,172 | Doremus | Sept. 20, 1921 |
| 1,851,475 | Zimmermann | Mar. 29, 1932 |
| 2,031,554 | Torchet | Feb. 18, 1936 |
| 2,597,302 | Dale | May 20, 1952 |

FOREIGN PATENTS

| | | |
|---|---|---|
| 234,485 | Great Britain | May 19, 1925 |
| 656,374 | Great Britain | Aug. 22, 1951 |